No. 683,641. Patented Oct. 1, 1901.
J. DODD.
SELF CONTAINED SPINDLE FOR SPINNING AND DOUBLING MACHINERY.
(Application filed Dec. 28, 1897.)
(No Model.) 2 Sheets—Sheet 1.
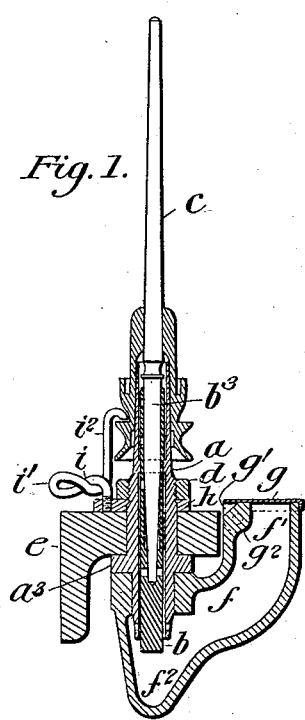
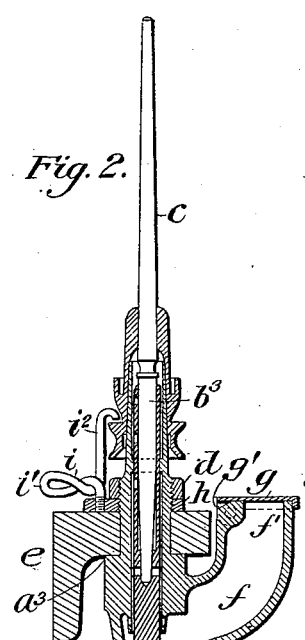
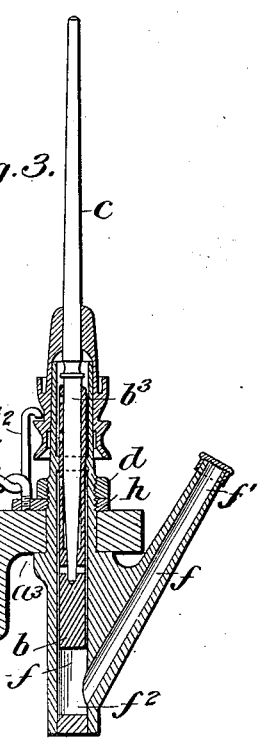
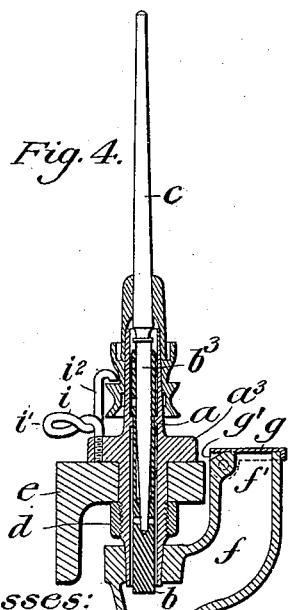
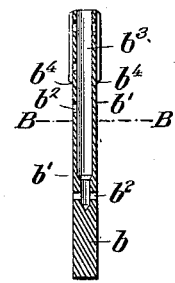
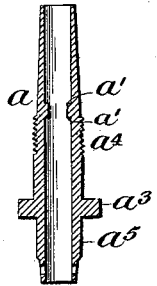
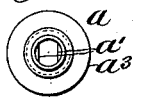

No. 683,641. Patented Oct. 1, 1901.
J. DODD.
SELF CONTAINED SPINDLE FOR SPINNING AND DOUBLING MACHINERY.
(Application filed Dec. 28, 1897.)
(No Model.) 2 Sheets—Sheet 2.

Witnesses:
Henry Thieme
George Barry Jr.

Inventor:
John Dodd
By attorneys
Brown & Seward

THE NORRIS PETERS CO., PHOTO-LITHO., WASHINGTON, D. C.

UNITED STATES PATENT OFFICE.

JOHN DODD, OF OLDHAM, ENGLAND.

SELF-CONTAINED SPINDLE FOR SPINNING AND DOUBLING MACHINERY.

SPECIFICATION forming part of Letters Patent No. 683,641, dated October 1, 1901.

Application filed December 28, 1897. Serial No. 663,909. (No model.)

*To all whom it may concern:*

Be it known that I, JOHN DODD, mechanical engineer, of Hartford Works, Oldham, in the county of Lancaster, England, have invented certain new and useful Improvements in Self-Contained Spindles for Spinning and Doubling Machinery, (for which Letters Patent of the United Kingdom of Great Britain and Ireland, dated August 23, 1895, and numbered 15,892, have been granted to me,) of which the following is a specification.

My invention relates to what are ordinarily termed "self-contained spindles;" and it consists in improvements in the construction of such apparatus, the object of the invention being chiefly to simplify and improve the construction of the bolsters and bolster-carriers and to provide for facilitating the oiling of the spindles.

As the bolster-carriers employed in self-contained spindles constructed according to my invention may be made in somewhat different forms while remaining of the same essential character, I have shown in the accompanying drawings four forms of bolster-carriers made according to my invention.

The bolsters and retaining-hooks constructed according to my invention may be employed in conjunction with self-contained spindles of somewhat different kinds and bolster-carriers made in somewhat different forms.

Figure 11:
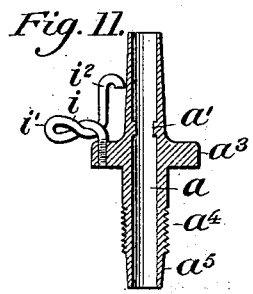
Figure 13:
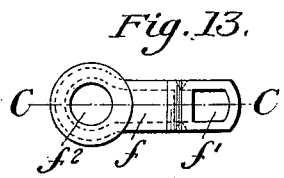
Figure 15:
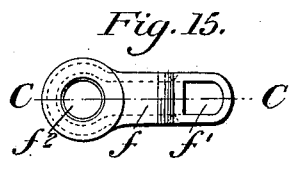
Figure 12:
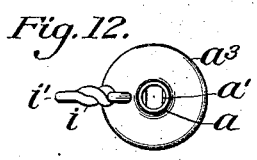
Figure 14:
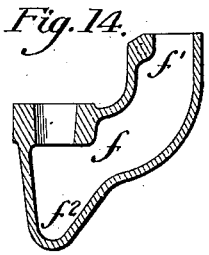
Figure 16:
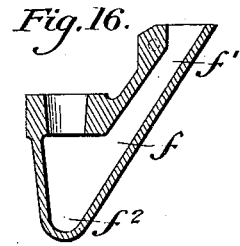
Figure 17:
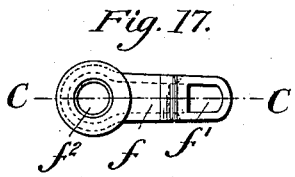
Figure 21:
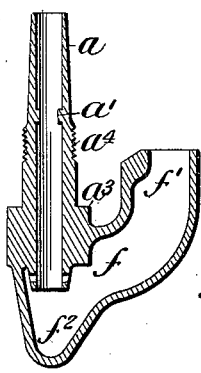
Figure 23:
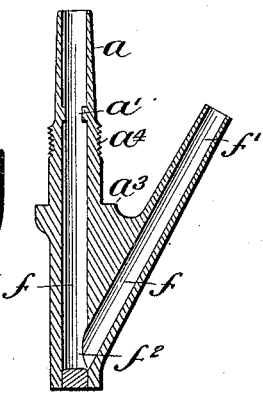
Figure 18:
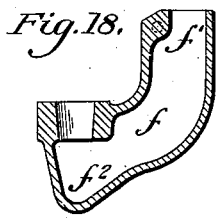
Figure 22:
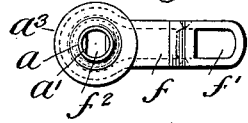
Figure 24:
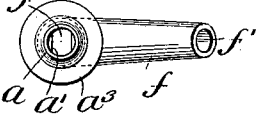
Figures 19, 20:

In the accompanying drawings, Figures 1, 2, 3, and 4 are vertical sections through self-contained spindles constructed according to my invention and also through the spindle-rails in which such spindles are mounted, each spindle and the retaining-hook employed in each case to prevent the spindle from being accidentally displaced from the bolster-carrier in which it is mounted being shown in side elevation, so that the said figures may be clearer. Fig. 5 is a side elevation of one of the bolsters which I employ; and Fig. 6 is a vertical section of the said bolster, taken on the plane indicated by the line A A of Fig. 5. Fig. 7 is a plan of such bolster; and Fig. 8 is a transverse section of such bolster, taken on the plane indicated by the line B B of Fig. 6. Fig. 9 is a vertical section of the bolster-carrier employed in the self-contained spindle illustrated in Fig. 1, and Fig. 10 is a plan of such bolster-carrier. Fig. 11 is a vertical section of the bolster-carrier employed in the self-contained spindle illustrated in Fig. 4, showing the retaining-hook employed therewith in side elevation; and Fig. 12 is a plan of such bolster-carrier. Fig. 13 is a plan, and Fig. 14 a vertical section, of the oil-reservoir employed in the self-contained spindle illustrated in Fig. 1, the line C C of Fig. 13 indicating the plane upon which the vertical section Fig. 14 is taken. Fig. 15 is a plan, and Fig. 16 a vertical section, of an oil-reservoir which can be employed in the self-contained spindle illustrated in Fig. 1 instead of the oil-reservoir illustrated in Figs. 13 and 14, the line C C of Fig. 15 indicating the plane upon which the vertical section Fig. 16 is taken. Fig. 17 is a plan, and Fig. 18 a vertical section, of the oil-reservoir employed in the self-contained spindle illustrated in Fig. 4, the line C C of Fig. 17 indicating the plane upon which the vertical section Fig. 18 is taken. Fig. 19 is a plan of the retaining-hook employed in the self-contained spindle illustrated in Fig. 1 and the collar in which such retaining-hook is secured, and Fig. 20 is a side elevation showing the said collar in vertical section. Fig. 21 is a vertical section, and Fig. 22 a plan, of the bolster-carrier employed in the self-contained spindle illustrated in Fig. 2. Fig. 23 is a vertical section, and Fig. 24 a plan, of the bolster-carrier employed in the self-contained spindle illustrated in Fig. 3.

In carrying out my invention as exemplified in the construction of the self-contained spindle illustrated in Fig. 1 I form the bolster-carrier $a$ of steel or other suitable material and bore or turn it out so as to form it with an internal collar, which is afterward partially cut away, so as to leave an interrupted collar, the parts of which together form a lock and support for the bolster, as is clearly indicated in Figs. 1, 9, and 10, in which $a'\,a'$ constitute the interrupted collar—that is to say, the parts of the internal collar which have not been cut away. The bolster $b$ to receive the spindle is preferably cylindrical and is cut away or flattened on both sides for a portion of its length, the flattened portions $b'$, which are clearly indicated in Figs. 1, 5, and 6, fitting between and against the shoulders or keys formed by the remaining parts $a'$ of the internal collar of the bolster-carrier $a$. The bolster $b$ when placed in the bolster-carrier $a$ will thus be held against being turned with the spindle $c$ and will be supported by the shoulders $b^4$, resting upon the parts $a'$ of the bolster-carrier $a$, and no difficulty will be experienced, as has prior to my invention often been the case, in inserting the bolster in the bolster-carrier. In the bolster $b$ there are formed holes $b^2$, which, with the cavity formed in such bolster $b$ and the spaces between the sides of such bolster $b$ and the interior surface of the bolster-carrier $a$, serve for the passage of oil to and from the bearings of the spindle $c$, which are formed in the bolster $b$.

A collar $a^3$ is formed on the bolster-carrier $a$, (illustrated in Figs. 1, 9, and 10,) and upon such bolster-carrier $a$ and above the collar $a^3$ there is formed a screw-thread $a^4$, upon which a nut $d$ is screwed after the upper part of the bolster-carrier $a$ has been passed through the spindle-rail $e$ from its lower side, so as to secure the bolster-carrier $a$ to the spindle-rail $e$. A part $a^5$ of the bolster-carrier $a$ which projects below the collar $a^3$ is formed slightly taper to receive a reservoir $f$ for oil, which forms the lower part of the bolster-carrier and which is shown detached in Figs. 13 and 14, and is forced tightly upon the taper part $a^5$ of the bolster-carrier $a$, so as to be secured thereto in a reliable and substantial manner as if both were formed of one piece of metal and so as to make an oil-tight joint therewith. The portion $f^2$ of the reservoir $f$ below the bottom of the bolster $b$ forms a chamber into and in which dirt may sink and remain undisturbed. The lateral portion $f'$ of the reservoir $f$ is prolonged upward in front of the spindle-rail $e$ and passing clear of such spindle-rail $e$ and clear of the part of the bolster-carrier $a$ which passes through the spindle-rail $e$ may extend above the level of the spindle-rail $e$, and so when filled with oil secure a head of oil sufficient to bring the level of the oil in the reservoir $f f'$ of the bolster-carrier to the shank of the spindle above the footstep when the spindle is at rest, and thus enable the oil to be raised freely to the upper bearing $b^3$ of the spindle $c$ in the bolster $b$ by capillary attraction and the rotation of the spindle and without any special oil-lifting device. The top of the lateral projecting part $f'$ of the oil-reservoir $f$ is preferably covered by a lid or any other suitable kind of cover to keep dust and dirt out of the reservoir. When the lid or cover is lifted up or removed, the tube of a syringe or pump can be passed down the practically straight passage formed by the lateral prolongation $f'$ of the reservoir $f$, into the lowest part $f^2$ of such reservoir $f$, where the dirty oil collects, so that it can be removed, pumped, or drawn out, the lowest portion of the oil being thus removed without it being necessary to remove the whole of the oil from the reservoir $f$ and without it being necessary to remove the spindle $c$ from the bolster-carrier $a$. In fact the operation can be performed while the spindle is running and without stopping the machine.

The oil-reservoir $f$ illustrated in Figs. 15 and 16 only differs from that illustrated in Figs. 1, 13, and 14 in being formed with an absolutely straight passage in its lateral prolongation $f'$ instead of with a practically straight passage.

In the specification filed in pursuance of the conditions of Letters Patent of the United Kingdom of Great Britain and Ireland, granted to myself and George Little, No. 238, dated January 17, 1882, is described an arrangement in which there is a chamber formed below the bolster communicating with a passage through which the tube of a pump can be inserted in order to withdraw the oil. An arrangement by which dirty oil could be so withdrawn would present in practice great advantages over arrangements such as that of a removable oil-cup which has to be removed in order to withdraw the dirty oil; but the arrangement described in such specification has not enabled the principle to be utilized in practice. By prolonging the oil-reservoir so as to form a branch which projects below and in front of the spindle-rail and so permits of the tube of a pump being passed down it to withdraw the oil, instead of passing the tube down through an opening formed in the bolster as in the former arrangement, I am enabled to overcome the disadvantages inherent in the former arrangement.

A collar $h$ is placed between the nut $d$ on the bolster-carrier $a$ and the top of the spindle-rail $e$ and secured in position by the screwing down of the nut $d$. To this collar $h$ is secured a retaining or holding-down hook $i$ for preventing the spindle $c$ from being lifted out of the bolster-carrier $a$. The retaining-hook $i$ which I prefer to use is shown separately in Figs. 19 and 20, and consists of a piece of wire formed with a loop $i'$, which extends sidewise from the vertical part $i^2$ of the hook $i$, which loop $i'$ is twisted so as to form a handle by means of which the hook $i$ can be turned, so as to liberate or secure the spindle $c$. The hook $i$ is screwed into the collar $h$. This particular form of retaining-hook is cheap and efficient, and I make a separate claim thereto at the end of this specification.

In the arrangement of self-contained spindle illustrated in Fig. 1 the reservoir $f$ is shown as being formed separate from the bolster-carrier $a$; but in the modifications illustrated in Figs. 2 and 21 and Figs. 3 and 23 the reservoir $f$ is shown cast in one piece with or formed out of the same piece of metal as the bolster-carrier $a$ or part thereof, the reservoir $f$ shown in Figs. 2 and 21 being formed in the formation by casting of the bolster-carrier $a$ and the reservoir $f$ shown in Figs. 3 and 23 being formed by the bolter-carrier $a$ being bored out and having its bottom closed by a plug inserted and secured therein in a reliable and substantial manner as if both were formed of one piece of metal and caused to make an oil-tight joint therewith.

The bolster-carrier $a$ (illustrated in Figs. 4, 11, and 12) is formed in such a manner that the collar $a^3$ formed upon it may rest upon the top of the spindle-rail $e$. Upon a part of the bolster-carrier $a$ (illustrated in Figs. 4, 11, and 12) which is below the collar $a^3$ there is formed a screw-thread $a^4$, upon which a nut $d$ is screwed after the lower part of the bolster-carrier $a$ has been put through the spindle-rail $e$ from its upper side, so that such nut $d$ will secure the bolster-carrier $a$ to the spindle-rail $e$. The part $a^5$ of the bolster-carrier $a$ below the thread $a^4$ is formed slightly taper to receive and make an oil-tight joint with the oil-reservoir $f$ shown in Figs. 17 and 18 and substantially similar to that hereinbefore described in reference to Figs. 1, 13, and 14. In this arrangement the retaining-hook $i$ is secured to the collar $a^3$ of the bolster-carrier $a$. The bolster-carrier $a$ made in this way may be inserted in a notch in the spindle-rail $e$ after the nut $d$ and reservoir $f$ have been secured upon such bolster-carrier $a$, and the bolster-carrier $a$ may then be fixed to the spindle-rail $e$ by tightening up the nut $d$.

In other respects than those hereinbefore described the self-contained spindles illustrated in Figs. 2, 3, and 4 are similar to the self-contained spindle illustrated in Fig. 1, and as I have in the several figures illustrating the parts employed in the self-contained spindles illustrated in Figs. 2, 3, and 4 applied to the parts shown the same letters of reference as are applied to the corresponding parts employed in the self-contained spindle illustrated in Fig. 1 I shall make no further separate reference to the self-contained spindles illustrated in Figs. 2, 3, and 4 or the parts employed therein.

The bolster-carriers $a$ and bolsters $b$ made according to my invention are simple in form, and therefore comparatively easy to make with any degree of accuracy which may be desirable, and the bolsters $b$ being supported by their upper ends are capable of being easily placed in position in the bolster-carriers $a$ in consequence of their upper parts projecting from such bolster-carriers $a$ until the lower parts of such bolsters have been inserted in proper position into the locks or supports provided in the bolster-carriers $a$.

The retaining or holding-down hooks $i$ made according to my invention are simple and cheap to construct, and stiff, strong, and reliable in use, since the twisting of the loops $i'$ of such retaining-hooks $i$ enables the portions of wire forming the sides of the loop $i'$ of each of such hooks $i$ to bear against and support each other and aid each other in resisting or transmitting any force which may be applied to the retaining-hook in order to turn it into or out of position to retain the spindle with which it is used in the bolster used therewith.

By the use of the oil-reservoirs arranged in accordance with my invention the oiling and investigation of the condition of the oil in use and the removal of dirty oil can be readily accomplished without the spindles being removed from the bolsters in which they are mounted, and such oil-reservoirs render unnecessary all loose oil-receptacles or other similar devices, such as have prior to my invention been sometimes employed to contain oil in self-contained spindles. Furthermore, the oil-reservoirs $f$ provided in accordance with my invention by being provided with the lateral prolongations $f'$, extending in front of the spindle-rails in which the self-contained spindles provided with such oil-reservoirs $f$ may be mounted, render it unnecessary for the syringes or pumps used for the removal of dirty oil therefrom to pass through the tubular parts of the bolster-carriers $a$, which surround and support the bolsters. By rendering it unnecessary for the syringes or pumps used for the removal of dirty oil from such oil-reservoirs to pass through the tubular parts of the bolster-carriers $a$ which surround and support the bolsters the oil-reservoirs provided in accordance with my invention enable the bolster-carriers to which they are applied to be made small in diameter at the said tubular parts which are inclosed by or pass through the spindle-rails in which they are to be mounted, and so enable the spindle-rails to be formed with correspondingly-small openings to receive such bolster-carriers.

The application of my invention to self-contained spindles thus results in securing simplicity and greatly facilitates accurate construction and also enables the bearings of the spindles to be efficiently and readily oiled.

It is obvious that so long as bolster-carriers provided with the locks or supports such as are hereinbefore described are employed to support the bolsters $b$ and prevent them from turning the bolsters $b$ made according to my invention, as hereinbefore described, may be mounted in bolster-carriers other than those hereinbefore described with much of the advantage of simplicity of form and construction and ease of placing in position in the bolster-carriers in which they are to be mounted which results from their employment in the manner hereinbefore described.

Oil-reservoirs made according to my invention and in the manner hereinbefore described may be employed in combination with bolster-carriers differing from those hereinbefore described in the mode of supporting and locking the bolster, which mode is not essential to the parts of my invention, as the advantages of oil-reservoirs made according to my invention can be obtained with other modes of supporting and locking the bolsters. It is also obvious that so long as the oil-reservoirs constructed according to my invention are secured to the bolster-carriers in conjunction with which they are employed in a reliable, firm, and substantial manner and so as to make oil-tight joints therewith in order to permit of a head of oil sufficient to allow the oil to rise freely to the upper parts of the bearings they may be secured thereto in other modes than are hereinbefore described.

What I claim, and desire to secure by Letters Patent, is—

1. In a self-contained spindle, the combination of a round bolster having at its upper end a bearing for the shank of the spindle and at its lower part a bearing for the foot of the spindle and having from near its upper end to its lowest extremity flattened portions and near its upper end shoulders, and a bolster-carrier having an interrupted collar which receives the flattened portions of the bolster and upon which the said shoulders rest, substantially as herein described.

2. In a self-contained spindle, the combination with a spindle-rail, of a bolster-carrier passing through the said spindle-rail and an oil-reservoir in said bolster-carrier reaching and having a space below the bottom of the bolster and formed with a prolongation extending below and upward in front of the spindle-rail and having a practically straight passage in line and continuous with the space below the bottom of the bolster and extending upward to the level of the shank of the spindle above the footstep to admit a head of oil to lubricate the shank of the spindle by gravitation, substantially as and for the purposes herein described.

3. In a self-contained spindle, the combination with a spindle-rail of a bolster-carrier passing through the said spindle-rail and furnished with a fixed collar to bear against the spindle-rail, and an oil-reservoir in the said bolster-carrier reaching and having a space below the bottom of the bolster and formed with a prolongation extending below and upward in front of the spindle-rail and having a practically straight passage in line and continuous with the space below the bottom of the bolster and extending upward to the level of the shank of the spindle to admit a head of oil to lubricate the shank of the spindle by gravitation, substantially as and for the purposes hereinbefore described.

4. In a self-contained spindle, the combination with a spindle-rail of a bolster-carrier passing through the said spindle-rail and furnished with a fixed collar to bear against the spindle-rail and with a screw-thread, and an oil-reservoir in the said bolster-carrier reaching and having a space below the bottom of the bolster and formed with a prolongation extending below and upward in front of the spindle-rail and having a practically straight passage in line and continuous with the space below the bottom of the bolster and extending upward to the level of the shank of the spindle above the footstep to admit a head of oil to lubricate the shank of the spindle by gravitation, and a nut upon the said screw-thread, substantially as and for the purposes herein described.

JOHN DODD.

Witnesses:
HOWARD CHEETHAM,
JAMES B. MILNER.